United States Patent
Choi

(10) Patent No.: US 11,893,181 B2
(45) Date of Patent: Feb. 6, 2024

(54) TOUCH DRIVING DEVICE HAVING A SENSING CIRCUIT AND DISPLAY DEVICE INCLUDING THE SAME

(71) Applicant: LX Semicon Co., Ltd., Daejeon (KR)

(72) Inventor: Yong Woo Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/940,535

(22) Filed: Sep. 8, 2022

(65) Prior Publication Data

US 2023/0084559 A1  Mar. 16, 2023

(30) Foreign Application Priority Data

Sep. 16, 2021 (KR) .................. 10-2021-0123623

(51) Int. Cl.
*G06F 3/041* (2006.01)
*G06F 3/044* (2006.01)
(52) U.S. Cl.
CPC ........ *G06F 3/04166* (2019.05); *G06F 3/0441* (2019.05)

(58) Field of Classification Search
CPC .................. G06F 3/04166; G06F 3/0441
See application file for complete search history.

(56) References Cited

U.S. PATENT DOCUMENTS

2021/0397327 A1* 12/2021 Lee .................. G06F 3/0412

FOREIGN PATENT DOCUMENTS

| KR | 10-1818477 B1 | 1/2018 |
| KR | 2020-0070640 A | 6/2020 |

* cited by examiner

*Primary Examiner* — Lisa S Landis
(74) *Attorney, Agent, or Firm* — ROTHWELL, FIGG, ERNST & MANBECK, P.C.

(57) ABSTRACT

The present embodiment relates to a touch driving device and a display device including the same, and more particularly, to a touch driving device capable of reducing the power consumption thereof by changing a sampling method thereof and a pulse of a touch drive signal, compared to a conventional touch driving device, and a display device including the same.

15 Claims, 12 Drawing Sheets

TOUCH DRIVING DEVICE HAVING A SENSING CIRCUIT AND DISPLAY DEVICE INCLUDING THE SAME

CROSS REFERENCE TO RELATED APPLICATION

This application claims priority to Republic of Korea Patent Application No. 10-2021-0123623 filed on Sep. 16, 2021, which is hereby incorporated by reference in its entirety.

BACKGROUND

1. Field of Technology

The present disclosure relates to a touch driving device and a display device including the same.

2. Related Technology

Typically, a panel including a plurality of touch electrodes for sensing an approach or touch of an object is referred to as a touch panel.

Such a touch panel may be completely separated from a display panel for displaying an image, depending on the shape thereof. Recently, however, a touch panel and a display panel may be coupled as one body in some cases. Therefore, the touch panel may be collectively referred to as a panel, without being distinguished from the display panel. In the following descriptions, it may be understood that the panel includes a plurality of touch electrodes for sensing an approach or touch of an object.

An approach or touch of an object to the panel may be sensed by a touch driving device for driving the panel.

The touch driving device outputs a touch drive signal to the panel, receives a reaction signal to the touch drive signal, and senses an approach or touch of the object to the panel.

Since such a touch driving device is added to a display device and always driven to sense frequent approaches or touches of an object, the power consumption of the touch driving device is increased. As a result, the power consumption of the display device is increased.

In this connection, the present embodiment has been made in an effort to provide a technology capable of reducing the power consumption of the touch driving device.

The discussions in this section is only to provide background information and does not constitute an admission of prior art.

SUMMARY

Under such a background, in one aspect, various embodiments are directed to providing a technology for reducing the power consumption of a touch driving device by changing a sampling method of the touch driving device and a pulse of a touch drive signal, compared to the related art.

In one aspect, an embodiment may provide a touch driving device including: a drive signal generation circuit configured to generate a touch drive signal and to supply the touch drive signal to one touch electrode; and a sensing circuit configured to receive a reaction signal of the one touch electrode to the touch drive signal, to convert the received reaction signal into a sensing voltage, and to sample the sensing voltage a plurality of times during a time period in which a pulse of the touch drive signal lasts.

In another aspect, an embodiment may provide a display device including: a panel including a plurality of touch electrodes; and a touch driving device configured to generate a touch drive signal and supply the generated touch drive signal to one touch electrode during a finger touch drive period, to receive a reaction signal of the one touch electrode to the touch drive signal and convert the received reaction signal into a sensing voltage, and to sample the sensing voltage a plurality of times during a pulse duration of the touch drive signal.

In still another aspect, an embodiment may provide a touch driving device including: a drive signal generation circuit configured to generate a touch drive signal whose pulse width is extended to a longer period than a sampling period of a sensing voltage and to supply the touch drive signal to one touch electrode; and a sensing circuit configured to receive a reaction signal of the one touch electrode to the touch drive signal, to convert the received reaction signal into a sensing voltage, and to sample the sensing voltage a plurality of times during a time period corresponding to the pulse width of the touch drive signal.

According to the embodiments, the touch driving device may output the touch drive signal having a longer pulse than in the conventional touch driving device, thereby minimizing the number of pulses contained in the touch drive signal. Thus, the charging/discharging count of the touch electrode may be minimized to reduce the power consumption of the touch driving device.

Furthermore, since the sensing voltage is sampled a plurality of times during the time period in which a pulse of the touch drive signal lasts, noise contained in the sensing voltage may be significantly canceled.

DETAILED DESCRIPTION OF EMBODIMENTS

Figure 1:
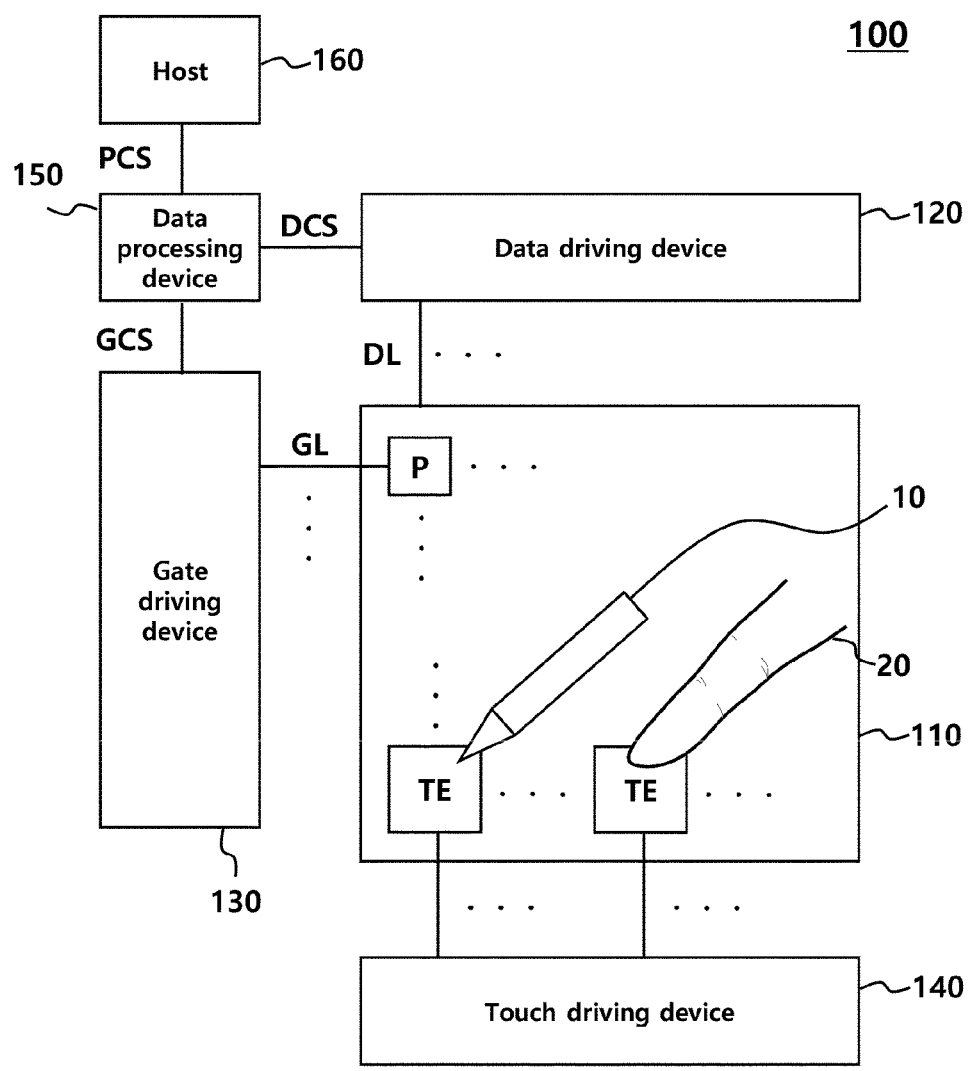
FIG. 1 is a configuration diagram of a display device in accordance with an embodiment.

FIG. 1 is a configuration diagram of a display device in accordance with an embodiment.

Referring to FIG. 1, a display device 100 may include a panel 110, a data driving device 120, a gate driving device 130, a touch driving device 140, a data processing device 150 and a host 160.

One or more of the data driving device 120, the gate driving device 130 and the touch driving device 140 may be included in one integrated circuit (IC).

For example, the data driving device 120 and the touch driving device 140 may be included in one IC. The IC including the data driving device 120 and the touch driving device 140 may be referred to as a source readout integrated circuit (SRIC).

The data driving device 120 may drive a data line DL connected to a pixel P, and the gate driving device 130 may drive a gate line GL connected to the pixel P. The touch driving device 140 may drive touch electrodes TE arranged on the panel 110.

The panel 110 may include a plurality of data lines DL, a plurality of gate lines GL and a plurality of pixels P, which are arranged therein.

Figure 3:
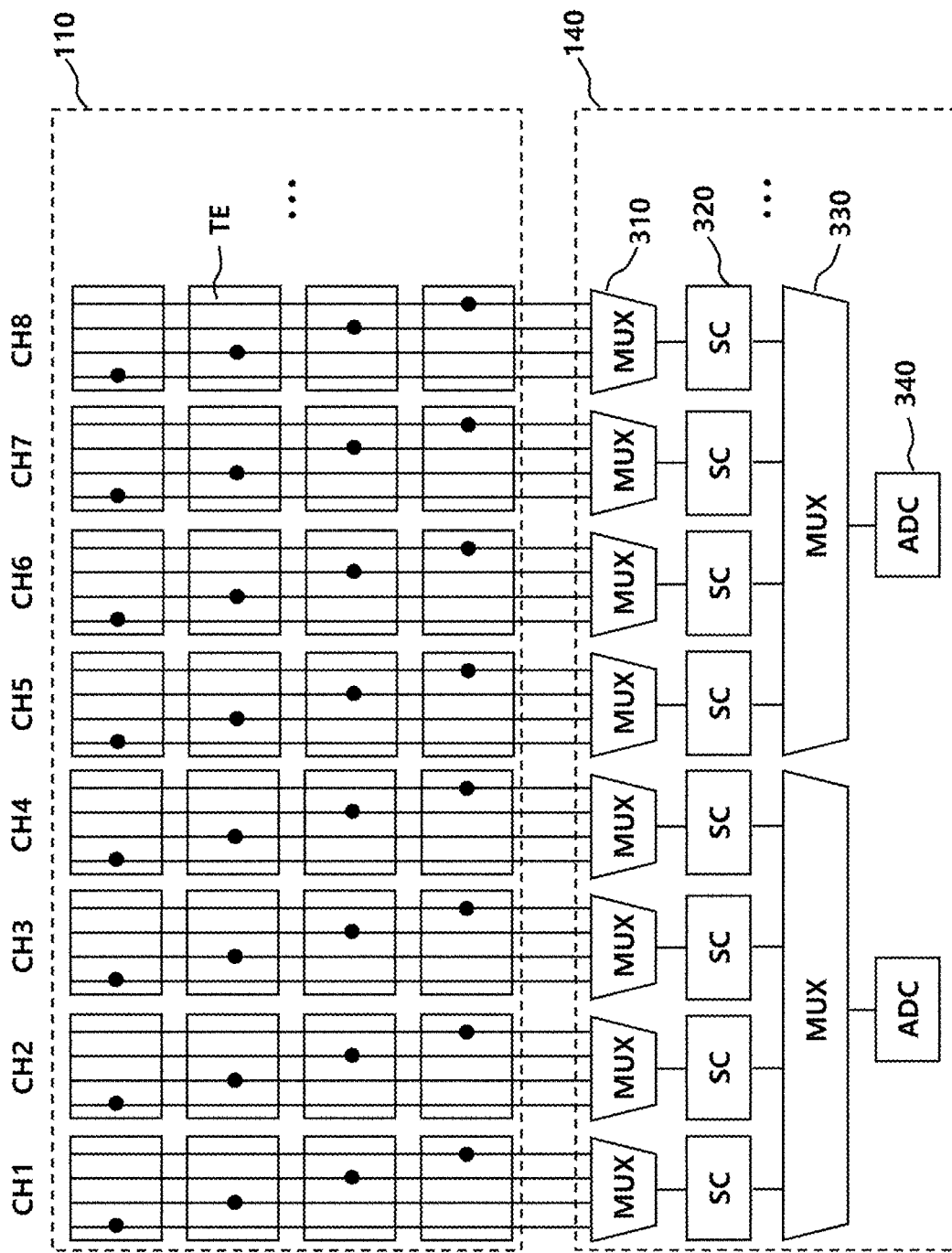
FIG. 3 is a diagram illustrating detailed configurations of a panel and a touch driving device in accordance with an embodiment.

The plurality of touch electrodes TE may be arranged on the panel 110 as illustrated in FIG. 3.

In other words, the panel 110 may include a display panel, and further include a touch screen panel (TSP). The display panel and the TSP may share some components. For example, the touch electrodes TE of the touch panel may be each used as a common electrode in the display panel, to which a common electrode voltage is supplied.

The configurations and locations of the plurality of touch electrodes TE may be changed depending on a touch method (e.g. self-capacitance method or mutual capacitance method).

The plurality of touch electrodes TE may be grouped on a column basis as illustrated in FIG. 3. One group may be referred to as a channel.

The data driving device 120 may supply a data voltage to a data line DL in order to display an image on each of the pixels P of the panel 110. The data driving device 120 may include one or more data driving ICs, and the one or more data driving ICs may be coupled to a bonding pad of the panel 110 through a tape automated bonding (TAB) method or chip-on-glass (COG) method, or directly formed in the panel 110. In some cases, the one or more data driving ICs may be integrated in the panel 110. The data driving device 120 may be implemented through a chip-on-film (COF) method.

The data driving device 120 may receive image data and a data control signal DCS from the data processing device 150. The data driving device 120 may generate a data voltage according to the grayscale value of each pixel, indicated by the image data, and drive the corresponding pixel.

The data control signal DCS may include one or more synchronization signals. For example, the data control signal DCS may include a vertical synchronization signal VSYNC, a horizontal synchronization signal HSYNC, a time division signal and the like.

The data driving device 120 may distinguish between frames according to the vertical synchronization signal VSYNC, and drive pixels in periods other than a vertical blank period indicated by the vertical synchronization signal VSYNC. The data driving device 120 may check image data for each horizontal line according to the horizontal synchronization signal HSYNC, and supply a data voltage to each horizontal line.

Figure 2:
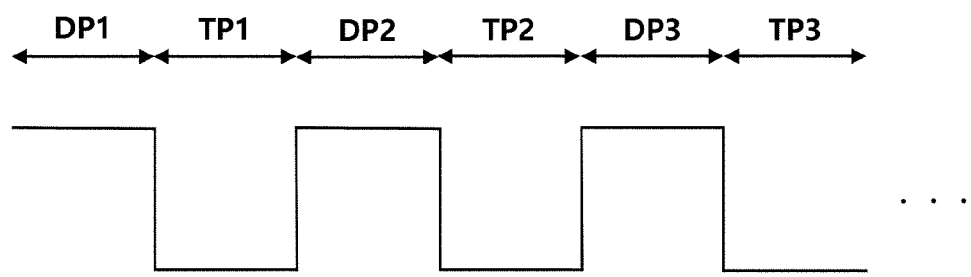
FIG. 2 is a diagram for describing a general time division driving method of a display device.

As illustrated in FIG. 2, the data driving device 120 may distinguish between a display drive period DP and a touch drive period TP according to the time division signal, and drive the pixels in the display drive period. One frame time may be divided into one display drive period DP and one touch drive period TP, or divided into two or more display drive periods DP and two or more touch drive periods TP.

The gate driving device 130 may supply a scan signal to the gate line GL to turn on/off a transistor located in each of the pixels P. Depending on a driving method, the gate driving device 130 may be located only on one side of the panel 110 as illustrated in FIG. 1. Alternatively, the gate driving device 130 may be divided into two parts and located on both sides of the panel 110. Furthermore, the gate driving device 130 may include one or more gate driving ICs, and the one or more gate driving ICs may be connected to a bonding pad of the panel 110 through the TAB or COG method, or implemented in a gate-in-panel (GIP) type and directly formed on the panel 110. Furthermore, the one or more gate driving ICs may be implemented through the COF method.

The gate driving device 130 may receive a gate control signal GCS from the data processing device 150. The gate control signal GCS may include a plurality of clock signals. The gate driving device 130 may generate a scan signal by using a clock signal, and supply the generated scan signal to the gate line GL.

The touch driving device 140 may drive a touch electrode TE by using a touch drive signal in a touch drive period (TP of FIG. 2).

The touch driving device 140 may recognize a touch through an active pen 10 and a touch through a finger 20.

For this operation, the touch driving device 140 may supply a pen touch drive signal for pen touch driving to the touch electrode TE or supply a finger touch drive signal for finger touch driving to the touch electrode TE, in the touch drive period TP of FIG. 2.

The touch driving device 140 may receive a downlink signal, transmitted to the touch electrode TE by the active pen 10, through the touch electrode TE in the touch drive period TP.

For example, in FIG. 2, the touch driving device 140 may supply the pen touch drive signal to the touch electrode TE in a first touch drive period TP1, and supply the finger touch drive signal to the touch electrode TE in a second touch drive period TP2. The touch driving device 140 may receive a downlink signal of the active pen 10 through the touch electrode TE in a third touch drive period TP3.

In general, the touch drive period in which the touch driving device 140 supplies the pen touch drive signal to the touch electrode TE or receives the downlink signal of the active pen 10 through the touch electrode TE may be referred to as a pen touch drive period, and the touch drive period in which the touch driving device 140 supplies the finger touch drive signal to the touch electrode TE and senses a touch of the finger 20 may be referred to as a finger touch drive period.

Furthermore, the pen touch drive period in which the touch driving device 140 supplies the pen touch drive signal to the touch electrode TE may be referred to as an uplink drive period, and the pen touch drive period in which the touch driving device 140 receives a downlink signal of the active pen 10 through the touch electrode TE may be referred to as a downlink drive period. The pen touch drive signal may be a beacon signal including various pieces of operation control information of the active pen 10 or a ping signal for synchronization of the downlink signal.

The touch driving device 140 may receive a touch control signal from the data processing device 150.

The touch control signal may include one or more synchronization signals. For example, the touch control signal may include the vertical synchronization signal VSYNC, the time division signal and a touch synchronization signal TSYNC. The touch driving device 140 may distinguish between the display drive period DP and the touch drive period TP according to the time division signal or the touch synchronization signal TSYNC.

The host 160 may transmit image data to the data processing device 150 and transmit the vertical synchronization signal VSYNC for dividing the image data in frame units. The data processing device 150 may generate the time division signal, the touch synchronization signal TSYNC and the like on the basis of the vertical synchronization signal VSYNC, and transmit the generated signals to the driving devices 120, 130 and 140.

In an embodiment, the touch driving device 140 may supply a touch drive signal to one touch electrode TE in order to recognize a touch by the finger 20, and receive a reaction signal of the touch electrode TE to the touch drive signal. Here, the touch drive signal may be the finger touch drive signal.

The touch driving device 140 may convert the reaction signal into a sensing voltage, and generate a sampling voltage by sampling the sensing voltage. Furthermore, the touch driving device 140 may convert the sampling voltage into a digital signal, and output the digital signal.

In an embodiment, the touch driving device 140 may generate a plurality of sampling voltages by sampling the sensing voltage a plurality of times during a time period in which a pulse of the touch drive signal lasts. The time period during which a pulse of the touch drive signal lasts may be referred to as a pulse duration.

When the touch driving device 140 samples the sensing voltage a plurality of times during the pulse duration of the touch drive signal, it may indicate that the touch driving device 140 extends the pulse width of the touch drive signal to a longer period than the sampling period of the sensing voltage.

As illustrated in FIG. 3, the touch driving device 140 may include one or more first multiplexers (MUXs) 310, one or more sensing circuits 320, one or more second MUXs 330 and one or more analog-digital converters (ADCs) 340.

The first MUX 310 may selectively connect one touch electrode of the touch electrodes TE, included in one channel, to the corresponding sensing circuit 320.

The sensing circuit 320 may receive a reaction signal from the touch electrode connected by the first MUX 310, and convert the reaction signal into a sensing voltage. Then, the sensing circuit 320 may sample the sensing voltage, and output the sampling voltage. The sensing circuit 320 may sample the sensing voltage a plurality of times during the pulse duration of the touch drive signal, and output a plurality of sampling voltages.

In other words, the pulse width of the touch drive signal may be extended to a longer period than the sampling period of the sensing voltage, and the sensing circuit 320 may sample the sensing voltage a plurality of times during a time period corresponding to the pulse width of the touch drive signal.

The second MUX 330 may selectively connect one sensing circuit of the sensing circuits 320 to the ADC 340.

The ADC 340 may sequentially receive the plurality of sampling voltages from the sensing circuit connected by the second MUX 330, and convert the plurality of sampling voltages into digital values, respectively.

The plurality of digital values acquired by the ADC 340 may be inputted to a touch controller (not illustrated). The touch controller (not illustrated) may calculate the average value of the plurality of digital values, and recognize whether the finger 20 has touched one touch electrode.

Hereafter, the configuration in which the sensing circuit 320 samples the sensing voltage a plurality of times and outputs a plurality of sampling voltages will be described in detail.

Figure 4:
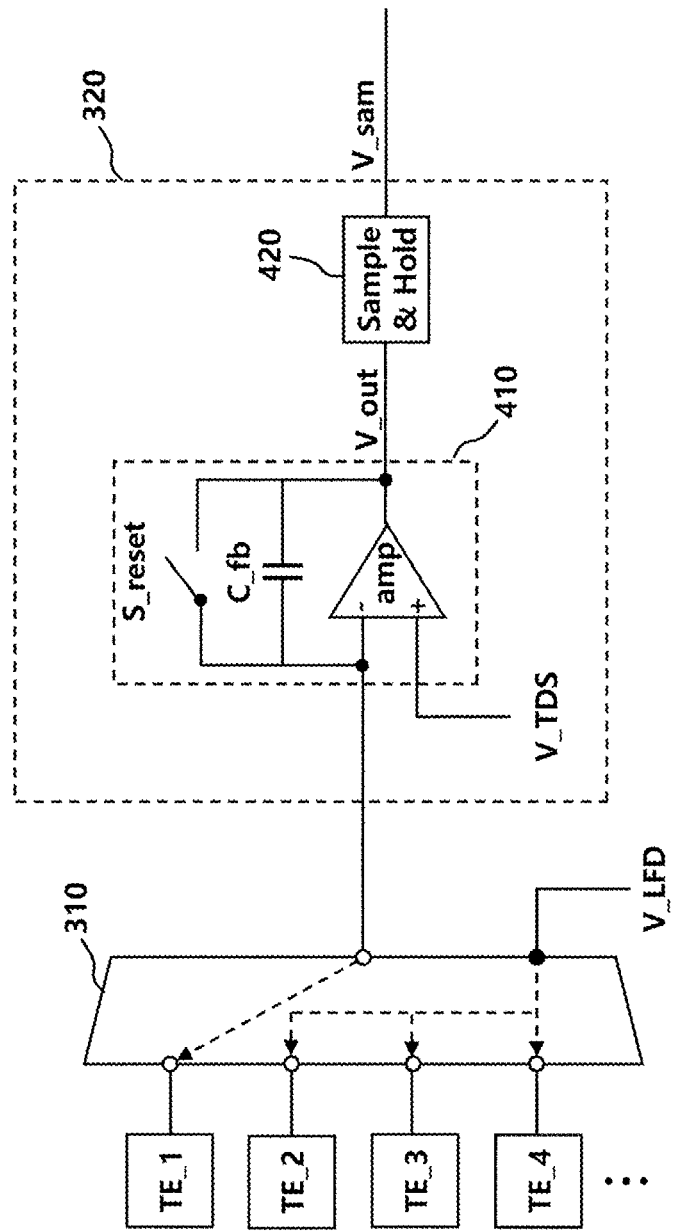
FIG. 4 is a diagram illustrating a detailed configuration of a sensing circuit in accordance with an embodiment.

FIG. 4 is a diagram illustrating a detailed configuration of a sensing circuit in accordance with an embodiment.

Referring to FIG. 4, the sensing circuit 320 may include an analog front-end circuit 410 and a sample and hold circuit 420.

The analog front-end circuit 410 may include an amp, a feedback capacitor C_fb and a reset switch S_reset. A touch drive signal V_TDS inputted through a non-inverting input terminal (+) of the amp may be outputted to an inverting input terminal (−) of the amp. The touch drive signal V_TDS outputted to the inverting input terminal (−) is supplied to one touch electrode (TE_1 of FIG. 4) through the first multiplexer 310. A load free signal V_LFD which is equal or similar to the touch drive signal V_TDS may be supplied to one or more conductors (e.g. TE_2, TE_3, TE 4 and the like of FIG. 4) located near the one touch electrode TE_1. When the load free signal V_LFD is supplied to a neighboring conductor in case that the touch drive signal V_TDS is supplied to the one touch electrode TE_1, it is possible to prevent parasitic capacitance from being formed between the one touch electrode TE_1 and the neighboring conductor. One or more conductors located near the one touch electrode TE_1 may include touch electrodes TE_2, TE_3, TE 4, . . . adjacent to the one touch electrode TE_1 and a data line DL and gate line GL adjacent to the one touch electrode TE_1.

The analog front-end circuit 410 may receive a reaction signal from the one touch electrode TE_1, and convert the reaction signal into a sensing voltage (V_out of FIG. 4). The analog front-end circuit 410 may operate as a pre-amplifier composed of the amp and a feedback capacitor C_fb.

The reset switch S_reset of the analog front-end circuit 410 resets the sensing voltage V_out of the one touch electrode TE_1.

The sample and hold circuit 420 may sample the sensing voltage V_out. The sensing voltage V_out sampled by the sample and hold circuit 420 may be referred to as a sampling voltage V_sam.

Figure 5:
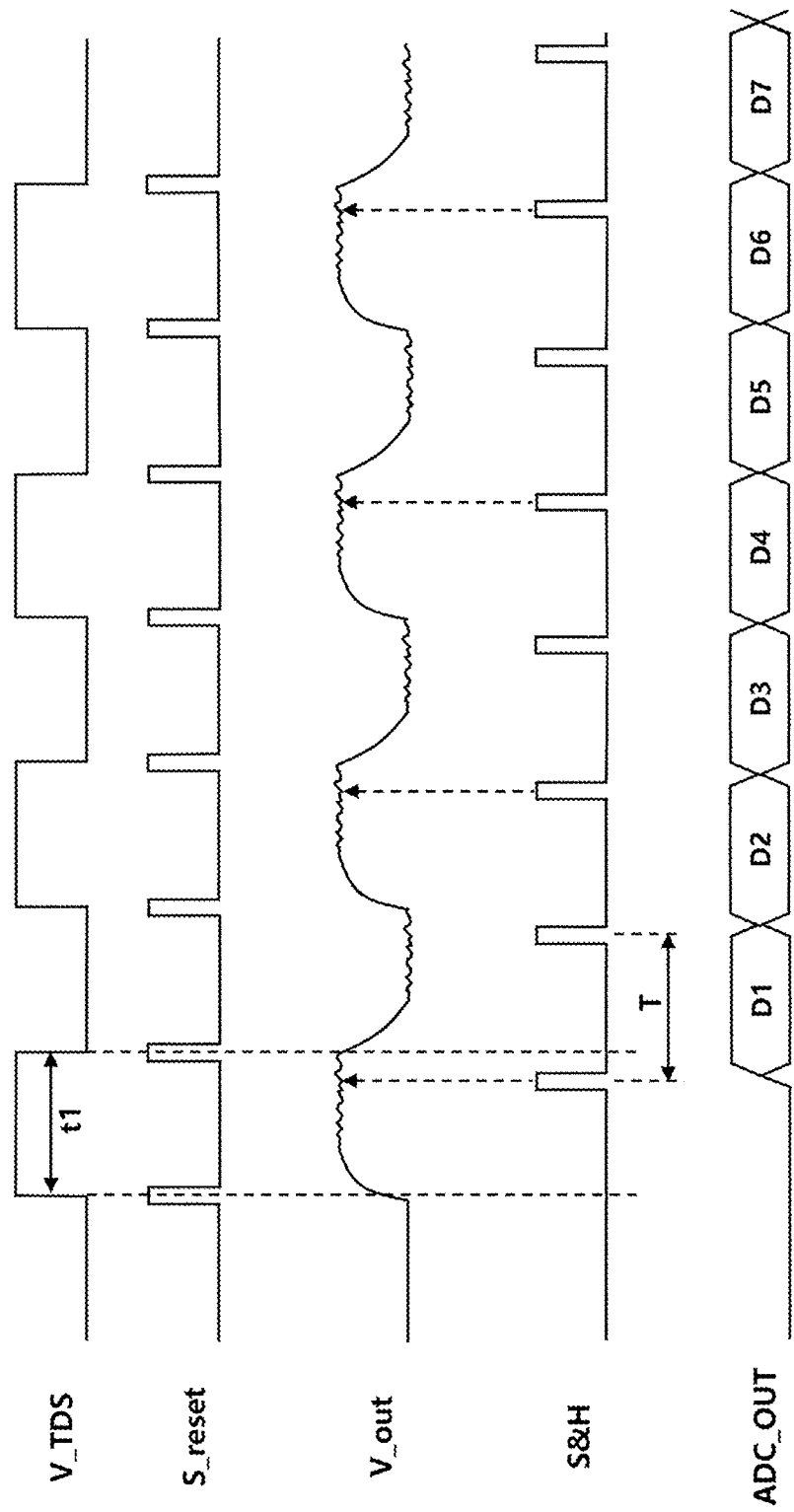
FIG. 5 is a diagram for describing a general driving operation of the touch driving device.

FIG. 5 is a diagram for describing a general driving operation of the touch driving device.

The touch drive signal (V_TDS of FIG. 5) which a conventional touch driving device supplies to one touch electrode includes a plurality of pulses, and the conventional touch driving device samples the sensing voltage (V_out of FIG. 5) only once during a pulse duration (t1 of FIG. 5) in which one pulse of the touch drive signal lasts.

In other words, the pulse width t1 of the touch drive signal supplied by the conventional touch driving device is shorter than or equal to the sampling period T of the sensing voltage V_out.

Here, one touch electrode may be repeatedly charged and discharged in proportion to the number of pulses contained in the touch drive signal.

Thus, in the conventional touch driving device, one touch electrode is frequently charged and discharged due to the plurality of pulses contained in the touch drive signal. As a result, the power consumption of the touch driving device is increased in order to charge and discharge one touch electrode.

Furthermore, in the conventional touch driving device, the load free signal supplied to one or more conductors located near one touch electrode also includes an equal or similar number of pulses to those of the touch drive signal. Thus, the one or more conductors are also frequently charged and discharged, thereby increasing the power consumption of the touch driving device.

Furthermore, since the conventional touch driving device samples the sensing voltage (V_out of FIG. 5) only once during the time period in which one pulse of the touch drive signal lasts, the touch driving device has a limitation in canceling noise contained in the sensing voltage. The noise contained in the reaction signal may also be contained in the sensing voltage (V_out of FIG. 5).

In general, as the sampling period of the sensing voltage is decreased or the sampling count of the sensing voltage is increased, much of noise contained in the sensing voltage may be canceled.

However, since the sampling count of the conventional touch driving device corresponds to the number of pulses contained in the touch drive signal, there is a limitation in increasing the sampling count of the touch driving device. Thus, there is also a limitation in canceling noise contained in the sensing voltage. The noise contained in the sensing voltage, i.e. the noise contained in the reaction signal, may be parasitic capacitance formed between one touch electrode and one or more conductors located near the one touch electrode or noise introduced from the outside.

In an embodiment, the pulse duration in which a pulse of the touch drive signal supplied to one touch electrode TE_1 by the touch driving device 140 lasts may be extended to minimize the number of pulses contained in the touch drive signal.

In other words, the pulse width of the touch drive signal may be extended to a longer period than the sampling period of the sensing voltage. Such a configuration may reduce the power consumption of the touch driving device 140.

In an embodiment, the touch driving device 140 may sample the sensing voltage a plurality of times during the extended pulse duration.

Through this operation, the sampling period of the touch driving device 140 may be decided regardless of the pulse generation period of the touch drive signal. Therefore, the sampling period of the touch driving device 140, i.e. the sampling count, may be freely increased, which makes it possible to significantly cancel noise contained in the sensing voltage.

Specifically, in an embodiment, the touch driving device 140 may further include a drive signal generation circuit 610 and a sampling control circuit 620 in addition to the sensing circuit 320.

The drive signal generation circuit 610 may generate the touch drive signal, and supply the generated touch drive signal to one touch electrode TE_1 included in the panel 110.

The drive signal generation circuit 610 may generate a touch drive signal (V_TDS of FIG. 8 or 9) having a pulse duration (t2 of FIG. 8 or t3 or t4 of FIG. 9) which is extended more than the pulse duration (t1 of FIG. 5) of the touch drive signal of the conventional touch driving device.

In other words, the drive signal generation circuit 610 may extend the pulse width of the touch drive signal to a longer period than the sampling period of the sensing circuit 320. The drive signal generation circuit 610 may extend the pulse width of the touch drive signal by an integer multiple of the sampling period.

Figure 8:
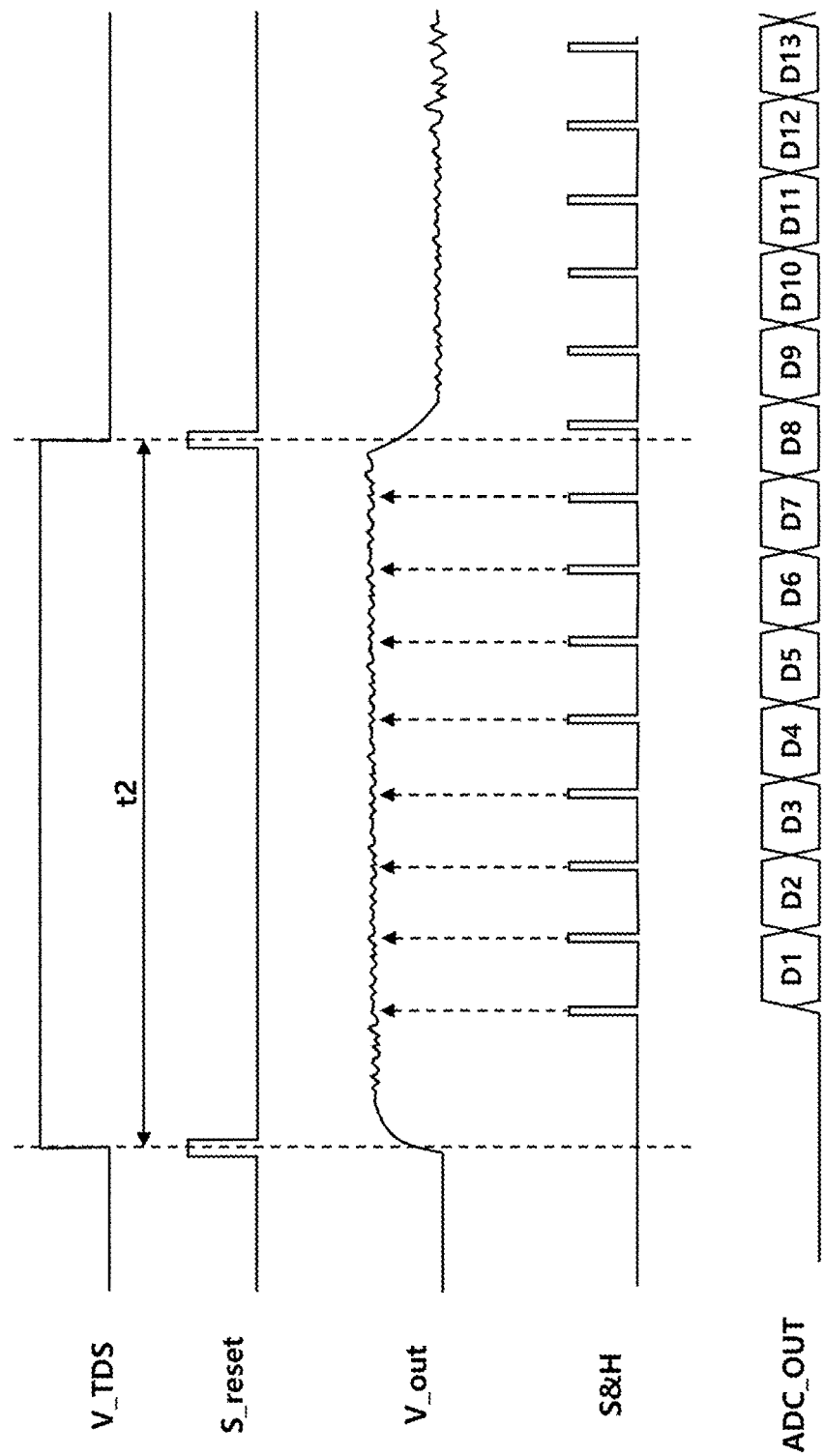
FIGS. 8 to 11 are diagrams for describing a finger touch driving operation of the touch driving device in accordance with an embodiment.

In an embodiment, the drive signal generation circuit 610 may generate a touch drive signal including one pulse las illustrated in FIG. 8 and supply the generated touch drive signal to one touch electrode TE_.

Figure 9:
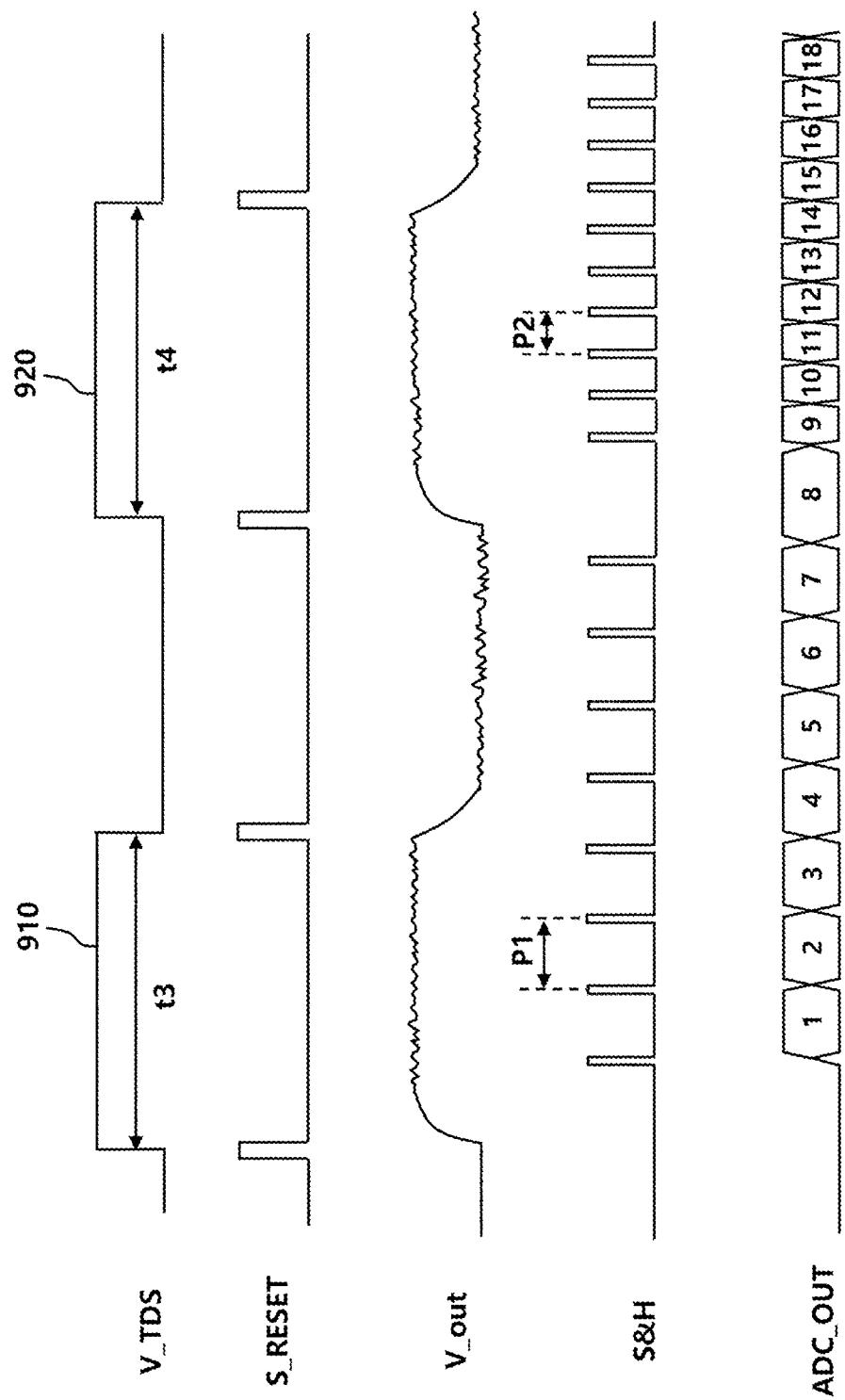

The drive signal generation circuit 610 may generate a touch drive signal including a first pulse 910 and a second pulse 920 as illustrated in FIG. 9, and supply the generated drive signal to the one touch electrode TE_1. The pulse duration (t3 of FIG. 9) of the first pulse 910 may be equal to the pulse duration (t4 of FIG. 9) of the second pulse 920.

When the drive signal generation circuit 610 generates the touch drive signal V_TDS including a minimum of pulses and supplies the generated touch drive signal V_TDS to the one touch electrode TE_1, the one touch electrode TE_1 may be charged and discharged a minimum number of times, which makes it possible to reduce the power consumption of the touch driving device 140 by the charging and discharging of the touch electrode.

The drive signal generation circuit 610 may generate the load free signal (V_LFD of FIG. 6) equal or similar to the touch drive signal V_TDS when outputting the touch drive signal V_TDS of FIG. 8 or 9 to the one touch electrode TE_1. The drive signal generation circuit 610 may supply the load free signal V_LFD to one or more conductors located near the one touch electrode.

When the drive signal generation circuit 610 supplies the one or more conductors with the load free signal V_LFD equal or similar to the touch drive signal V_TDS, i.e. the load free signal V_LFD including a minimum of pulses like the touch drive signal V_TDS, the one or more conductors may be charged and discharged a minimum number of times, which makes it possible to reduce the power consumption of the touch driving device 140 by the charging and discharging of the one or more conductors.

The sampling control circuit 620 may control the sampling period of the sensing circuit 320.

Specifically, the sampling control circuit 620 may control the sample and hold circuit 420 to sample the sensing voltage (V_out of FIG. 8), outputted by the analog front-end circuit 410 of the sensing circuit 320, a plurality of times during the pulse duration t2 of the touch drive signal V_TDS.

Figure 7:
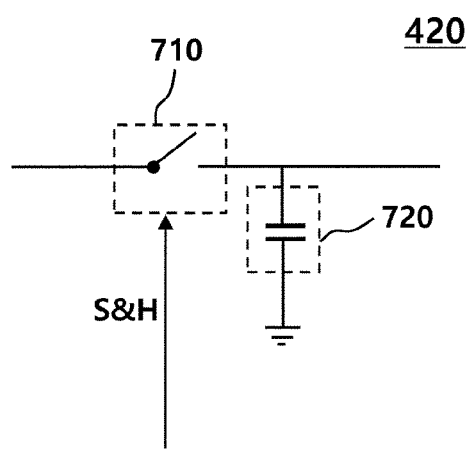
FIG. 7 is a diagram illustrating a sample and hold circuit of a sensing circuit in accordance with an embodiment.

The sample and hold circuit 420 may include a sampling switch 710 and a hold capacitor 720 as illustrated in FIG. 7, and the sampling control circuit 620 may output a control signal (S&H of FIG. 8) for turning on the sampling switch 710 in each preset sampling period, such that the sampling switch 710 is turned on/off a plurality of times according to the sampling period.

In an embodiment, the sampling control circuit 620 may shorten the sampling period of the sensing circuit 320 further than in the conventional touch driving device. For example, when the existing sampling period is 0.8 ms, the sampling control circuit 620 may shorten the sampling period of the sensing circuit 320 to 0.4 ms.

When the sampling period of the sensing circuit 320 is shortened by the sampling control circuit 620, noise contained in the sensing voltage may be significantly canceled.

The noise contained in the reaction signal may also be contained in the sensing voltage (V_out of FIG. 8).

Figure 6:
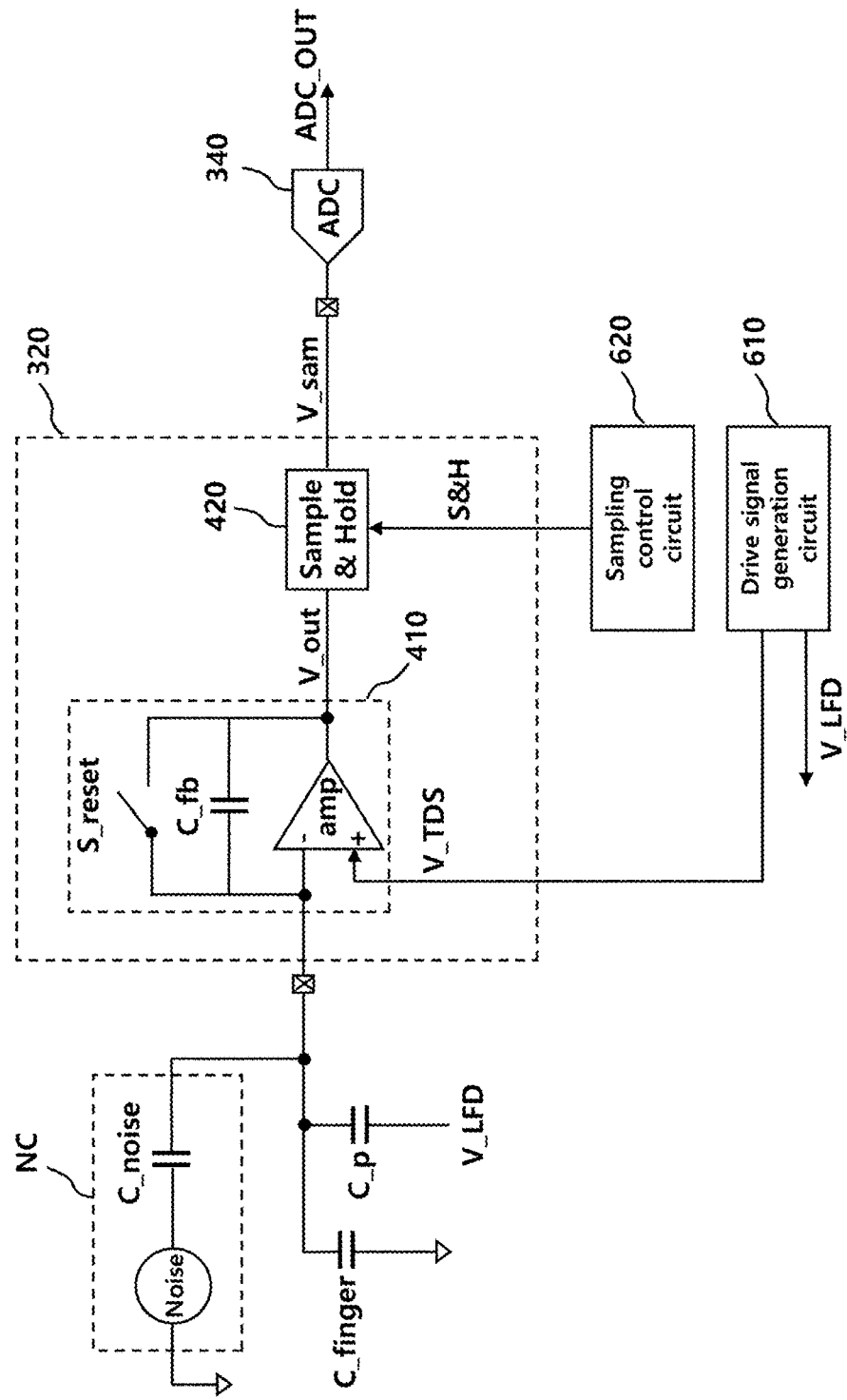
FIG. 6 is a diagram for describing a configuration of a touch driving device in accordance with an embodiment.

In other words, the noise contained in the reaction signal may be modeled as a circuit NC including a noise source Noise and capacitance component C_noise as illustrated in FIG. 6, and the sensing voltage may be expressed as in the following equation.

Equation 1 expresses the sensing voltage V_out when the finger 20 touches the one touch electrode TE_1.

In Equation 1, $V_{TDS}$ represents the voltage value of the touch drive signal, $C_{fb}$ represents the capacitance of a feedback capacitor, $C_{finger}$ represents capacitance formed between the finger 20 and the one touch electrode TE_1, and $C_{noise1}$ and $V_{noise1}$ represent the capacitance and voltage values of noise which is generated when the finger 20 touches the one touch electrode TE_1.

$$V_{out} = \left(1 + \frac{C_{finger}}{C_{fb}}\right) V_{TDS} - \frac{C_{noise1}}{C_{fb}} V_{noise1} \quad \text{[Equation 1]}$$

Equation 2 expresses the sensing voltage V_out when the finger 20 does not touch one touch electrode TE_1.

In Equation 2, $V_{TDS}$ represents the voltage value of the touch drive signal, $C_{fb}$ represents the capacitance of the feedback capacitor, and $C_{noise2}$ and $V_{noise2}$ represent the capacitance and voltage values of noise which is generated when the finger 20 does not touch one touch electrode TE_1.

$$V_{out} = V_{TDS} - \frac{C_{noise2}}{C_{fb}} V_{noise2} \quad \text{[Equation 2]}$$

As can be seen in Equations 1 and 2, the noise contained in the reaction signal may also be contained in the sensing voltage V_out.

In an embodiment, the sampling control circuit 620 may shorten the sampling period of the sensing circuit 320, or increase the sampling count of the sensing circuit 320, thereby significantly canceling the noise contained in the sensing voltage V_out.

In other words, the sampling control circuit 620 may control the sensing circuit 320 to perform over-sampling during the pulse duration t2 of the touch drive signal V_TDS.

In an embodiment, when the drive signal generation circuit 610 supplies the touch drive signal V_TDS including the first and second pulses 910 and 920 to one touch electrode TE_1, the sampling control circuit 620 may control the sensing circuit 320 to sample the sensing voltage V_out according to a first sampling period P1 during the pulse duration t3 of the first pulse 910.

Furthermore, during the pulse duration t4 of the second pulse 920, the sampling control circuit 620 may control the sensing circuit 320 to sample the sensing voltage V_out according to a second sampling period P2. The first sampling period P1 and the second sampling period P2 may be different from each other. In other words, the second sampling period P2 may be a period shortened or extended by a fractional multiple of the first sampling period P1.

When the sampling control circuit 620 controls the sampling period of the sensing circuit 320 differently for two pulses contained in the touch drive signal V_TDS, the noise contained in the sensing voltage may be further canceled.

In an embodiment, when the drive signal generation circuit 610 supplies the touch drive signal V_TDS including the first and second pulses 910 and 920 to one touch electrode TE_1, the sampling control circuit 620 may further control the sampling start point of the sensing circuit 320, in case that the drive signal generation circuit 610 outputs a pulse of the touch drive signal V_TDS.

Figure 10:
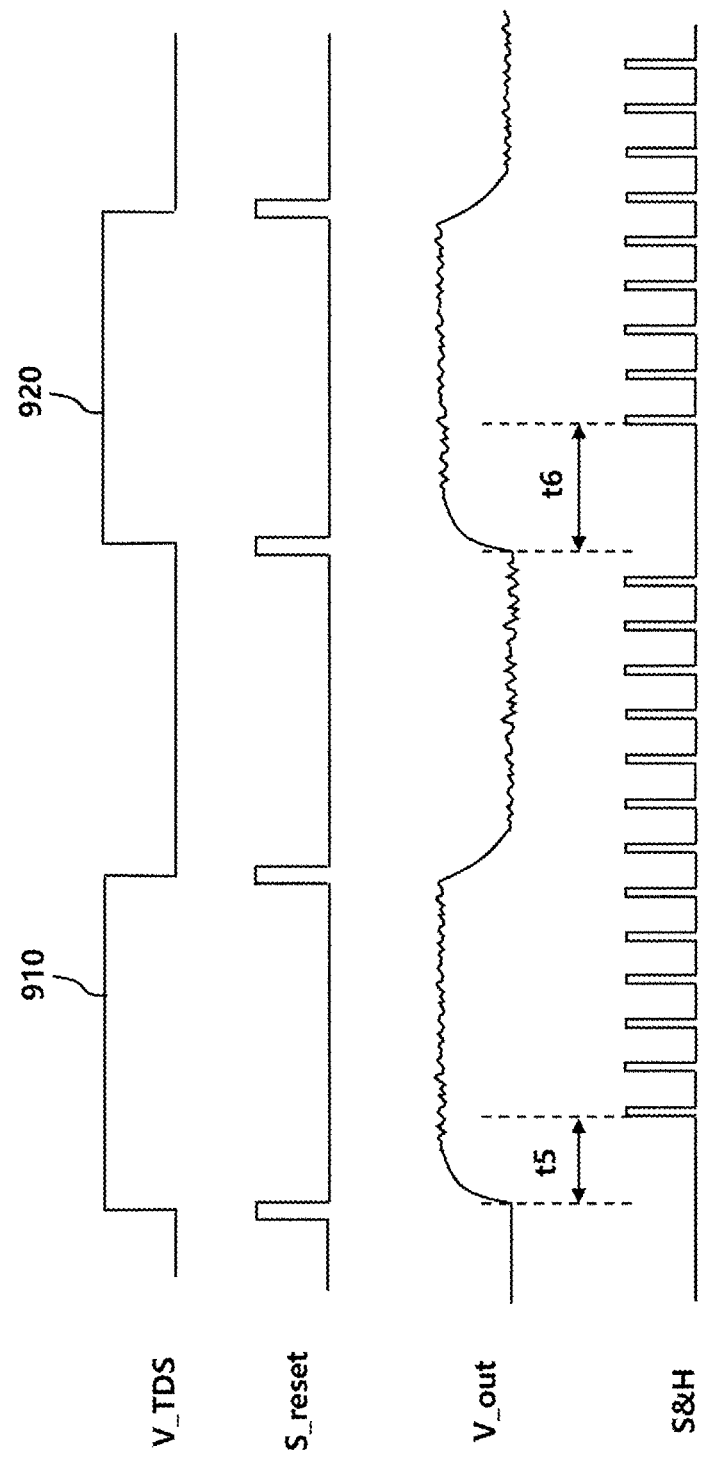

Specifically, when the drive signal generation circuit 610 outputs the first pulse 910, the sampling control circuit 620 may control the sensing circuit 320 to start sampling the sensing voltage V_out after a first time t5 from the point of time that the first pulse 910 is outputted, as illustrated in FIG. 10.

Furthermore, when the drive signal generation circuit 610 outputs the second pulse 920, the sampling control circuit 620 may control the sensing circuit 320 to start sampling the sensing voltage V_out after a second time t6 from the point of time that the second pulse 920 is outputted. The first time t5 and the second time t6 may be different from each other.

For example, the second time t6 may be 0.5 or 1.5 times the first time t5.

When the first time t5 is 1 ms, the second time t6 may be 0.5 ms or 1.5 ms.

Figure 11:
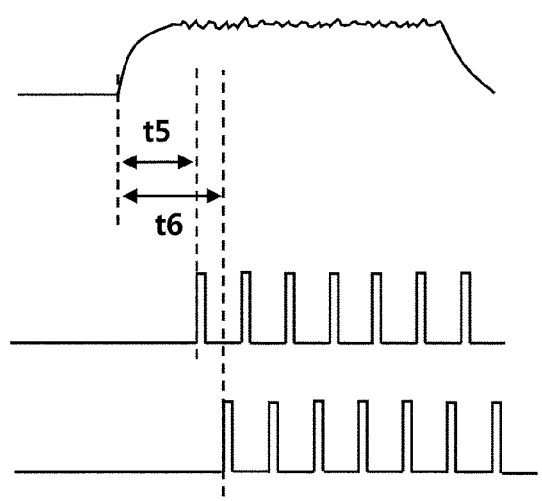

When the sampling control circuit 620 differently controls the sampling start point of the sensing circuit 320 in case that noise contained in the sensing voltage for the first pulse 910 and noise contained in the sensing voltage for the second pulse 920 have the same or similar pattern, the sampling point when the first pulse 910 is outputted and the sampling point when the second pulse 920 is outputted may not coincide with each other as illustrated in FIG. 11. Thus, the sampling count of the sensing circuit 320 for the sensing voltage may be indirectly increased.

In accordance with the above-described embodiment, the touch driving device 140 may output the touch drive signal V_TDS having a longer pulse than in the conventional touch driving device, thereby minimizing the number of pulses contained in the touch drive signal V_TDS. Thus, the charging/discharging count of the touch electrode may be minimized to reduce the power consumption of the touch driving device 140.

Furthermore, since the sensing voltage V_out is sampled a plurality of times during the time period in which a pulse of the touch drive signal V_TDS lasts, noise contained in the sensing voltage V_out may be significantly canceled.

In an embodiment, the touch driving device 140 may minimize the number of pulses contained in the touch drive signal V_TDS, when the touch driving device 140 recognizes a touch through the finger 20, i.e. during the finger touch drive period, and sample the sensing voltage V_out a plurality of times during the time period in which a pulse of the touch drive signal V_TDS lasts, i.e. the pulse duration of the touch drive signal V_TDS. Here, the touch drive signal may be a finger touch drive signal.

During a pen touch drive period, the touch driving device 140 may receive a downlink signal of the active pen 10, inputted to one touch electrode TE_1, and convert the downlink signal into a pen sensing voltage. The touch driving device 140 may sample the pen sensing voltage once during the pulse duration of the downlink signal, and thus output one sampling voltage.

Figure 12:
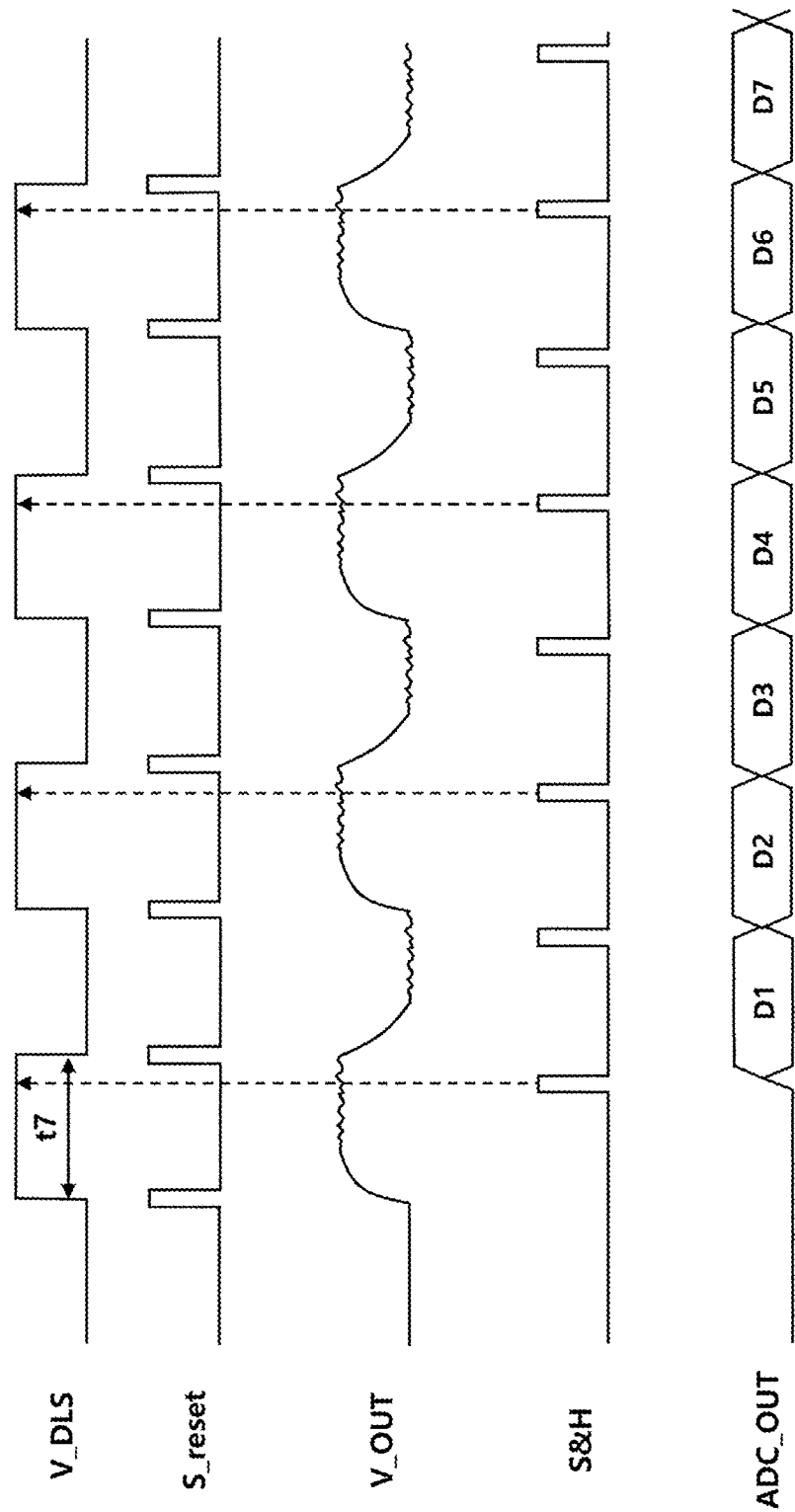
FIG. 12 is a diagram for describing a pen touch driving operation of the touch driving device in accordance with an embodiment.

Referring to FIG. 12, the sensing circuit 320 of the touch driving device 140 may convert a downlink signal V_DLS of the active pen 10, inputted to one touch electrode TE_1 during the pen touch drive period, into a pen sensing voltage V_OUT.

The sensing circuit 320 may sample the pen sensing voltage V_OUT once during the time t7 in which the pulse of the downlink signal V_DLS lasts, and thus output one sampling voltage.

In other words, the sensing circuit 320 may sample the pen sensing voltage V_OUT once during a time period corresponding to the pulse width of the downlink signal.

What is claimed is:

1. A touch driving device comprising:
    a drive signal generation circuit configured to generate a touch drive signal, the touch drive signal comprising one or more pulses, and to supply the touch drive signal to one touch electrode; and
    a sensing circuit configured to receive a reaction signal of the one touch electrode to the touch drive signal, to convert the received reaction signal into a sensing voltage, and to sample the sensing voltage a plurality of times during a time period corresponding to the pulse width of the touch drive signal.

2. The touch driving device of claim 1, wherein the drive signal generation circuit is configured to generate a load free signal equal to the touch drive signal when supplying the touch drive signal comprising a single pulse to the one touch electrode and supply the load free signal to one or more conductors located near the one touch electrode.

3. The touch driving device of claim 1, further comprising a sampling control circuit configured to control a sampling period of the sensing circuit.

4. The touch driving device of claim 3, wherein
the touch drive signal comprises a first pulse and a second pulse which have the same pulse duration and
the sampling control circuit is configured to control the sensing circuit to sample the sensing voltage every first sampling period when the drive signal generation circuit outputs the first pulse, and control the sensing circuit to sample the sensing voltage every second sampling period, which is different from the first sampling period, when the drive signal generation circuit outputs the second pulse.

5. The touch driving device of claim 3, wherein the sampling control circuit is further configured to control a sampling start point of the sensing circuit when the drive signal generation circuit outputs a pulse of the touch drive signal.

6. The touch driving device of claim 5, wherein
the touch drive signal comprises a first pulse and a second pulse, and
when the drive signal generation circuit outputs the first pulse, the sampling control circuit is configured to control the sensing circuit to start sampling the sensing voltage after a first time from a time point at which the first pulse is outputted and,
when the drive signal generation circuit outputs the second pulse, the sampling control circuit is configured to control the sensing circuit to start sampling the sensing voltage after a second time from a time point at which the second pulse is outputted, and the first time and the second time are different from each other.

7. The touch driving device of claim 1, wherein
the touch drive signal is a finger touch drive signal for the sensing circuit to sense a finger touch during a finger touch drive period and
the sensing circuit is configured to convert a downlink signal of an active pen, inputted to the one touch electrode during a pen touch drive period, into a pen sensing voltage and sample the pen sensing voltage once during the time period in which a pulse of the downlink signal lasts.

8. A display device comprising:
a panel comprising a plurality of touch electrodes; and
a touch driving device configured to generate a touch drive signal, the touch drive signal comprising one or more pulses, and supply the generated touch drive signal to one touch electrode during a finger touch drive period, to receive a reaction signal of the one touch electrode to the touch drive signal and convert the received reaction signal into a sensing voltage, and to sample the sensing voltage a plurality of times during a pulse duration of the touch drive signal corresponding to the pulse width of the touch drive signal.

9. The display device of claim 8, wherein the touch driving device is configured to generate the touch drive signal comprising a single pulse and supply a load free signal equal to the touch drive signal to one or more conductors located near the one touch electrode when supplying the touch drive signal to the one touch electrode.

10. The display device of claim 8, wherein the touch driving device is configured to generate the touch drive signal comprising a first pulse and a second pulse, which have the same pulse duration, sample the sensing voltage every first sampling period when outputting the first pulse, and sample the sensing voltage every second sampling period different from the first sampling period when outputting the second pulse.

11. The display device of claim 10, wherein the second sampling period is a period obtained by shortening or extending the first sampling period by a fractional multiple of the first sampling period.

12. The display device of claim 8, wherein, during a pen touch drive period, the touch driving device is configured to receive a downlink signal of an active pen, inputted to the one touch electrode, convert the received downlink signal into a pen sensing voltage, and sample the pen sensing voltage once during a time period in which a pulse of the downlink signal lasts.

13. A touch driving device comprising:
a drive signal generation circuit configured to generate a touch drive signal whose pulse width is extended to be longer than a sampling period of a sensing voltage and to supply the touch drive signal to one touch electrode; and
a sensing circuit configured to receive a reaction signal of the one touch electrode to the touch drive signal, to convert the received reaction signal into the sensing voltage, and to sample the sensing voltage a plurality of times during a time period corresponding to the pulse width of the touch drive signal.

14. The touch driving device of claim 13, wherein the drive signal generation circuit is configured to extend the pulse width by an integer multiple of the sampling period.

15. The touch driving device of claim 13, wherein
the touch drive signal is a finger touch drive signal for the sensing circuit to sense a finger touch during a finger touch drive period,
the sensing circuit is configured to convert a downlink signal of an active pen, inputted to the one touch electrode during a pen touch drive period, into a pen sensing voltage and sample the pen sensing voltage once during a time period corresponding to the pulse width of the downlink signal.

* * * * *